United States Patent
Chang

(10) Patent No.: US 12,520,388 B2
(45) Date of Patent: Jan. 6, 2026

(54) INDUCTING RANGE APPARATUS FOR DETECTING CONTAINER

(71) Applicant: Techrein CO., LTD, Seoul (KR)

(72) Inventor: Hyun Yung Chang, Goyang-si (KR)

(73) Assignee: Techrein CO., LTD, Seoul (KR)

( * ) Notice: Subject to any disclaimer, the term of this patent is extended or adjusted under 35 U.S.C. 154(b) by 167 days.

(21) Appl. No.: 17/136,195

(22) Filed: Dec. 29, 2020

(65) Prior Publication Data

US 2022/0201807 A1 Jun. 23, 2022

(30) Foreign Application Priority Data

Dec. 17, 2020 (KR) .......................... 10-2020-0177410

(51) Int. Cl.
*H05B 6/06* (2006.01)
*H05B 1/02* (2006.01)
*H05B 6/12* (2006.01)

(52) U.S. Cl.
CPC ........... *H05B 6/062* (2013.01); *H05B 1/0266* (2013.01); *H05B 6/1281* (2013.01); *H05B 2213/07* (2013.01)

(58) Field of Classification Search
CPC .. H05B 1/0266; H05B 2213/07; H05B 6/062; H05B 6/1281; H05B 6/04; H05B 6/1209; H05B 2213/05
USPC ................. 219/626, 624, 628, 665; 362/117
See application file for complete search history.

(56) References Cited

U.S. PATENT DOCUMENTS

| 7,075,044 B2 * | 7/2006 | Ryu ...................... H05B 6/062 |
| | | 219/668 |
| 2016/0029439 A1 * | 1/2016 | Kurose .................. H05B 6/065 |
| | | 219/626 |
| 2021/0127459 A1 * | 4/2021 | Ok .......................... H05B 6/06 |

FOREIGN PATENT DOCUMENTS

| EP | 2 360 989 A1 | 8/2011 |
| EP | 2 533 605 A2 | 12/2012 |
| EP | 3 439 429 A1 | 2/2019 |
| EP | 3 637 954 A1 | 4/2020 |
| JP | 6413094 B2 | 10/2018 |

(Continued)

OTHER PUBLICATIONS

Machine translation of KR-100261518: Kim, A apparatus for driving of Induction heating cooker and method thereof, 2000 (Year: 2000).*

(Continued)

*Primary Examiner* — Vy T Nguyen
*Assistant Examiner* — Abigail H Rhue
(74) *Attorney, Agent, or Firm* — Goldilocks Zone IP Law

(57) ABSTRACT

An induction range apparatus includes a controller determine whether the container is disposed on the working coil, and the container disposed on the working coil is heated through induction heating, in a container sensing mode, and configured to output a block signal so that induction power outputted from an inverter driver is prevented from being input into a first detector, in an induction heating mode; and a blocking part outputting the induction power input from the inverter driver to the working coil or preventing the induction power input from the inverter driver from being input into the first detector or outputting the sensing signal to the working coil, on the basis of any two or less of the input of the induction power from the inverter driver, the (Continued)

input of the unblock signal from the controller, and the input of the block signal from the controller.

2 Claims, 6 Drawing Sheets

(56) References Cited

FOREIGN PATENT DOCUMENTS

KR         100261518 B1 * 7/2000
KR         10-2045993 B1   11/2019

OTHER PUBLICATIONS

Office action issued on Jun. 15, 2021 of the European patent application No. 20217818.2 which corresponds to the this application.
Office action issued on Feb. 3, 2021 of the Korean patent application No. KR 10-2020-0177410 which corresponds to the this application.

* cited by examiner

100

100

INDUCTING RANGE APPARATUS FOR DETECTING CONTAINER

CROSS-REFERENCE TO RELATED APPLICATIONS

This application claims the benefit under 35 U.S.C. section 119, which claims foreign priority to Korean Patent Application No. KR10-2020-0177410, filed on Dec. 17, 2020, in the Korean Intellectual Property Office, the disclosure of which is hereby incorporated by reference in its entirety.

BACKGROUND OF THE DISCLOSURE

Field of the Disclosure

The present disclosure relates to an induction range apparatus capable of sensing a container and, more particularly, to an induction range apparatus capable of sensing a container, which can sense a container using a sensing signal that is a low-voltage and high-frequency signal.

Related Art

An induction range is configured such that, when a heating pot or container (hereinafter referred to as a "heating container") is placed on a portion of a working coil, the working coil starts to generate heat and thereby heats the container. Even if objects other than the heating container, for example, rice bowls, chopsticks, tongs, scrubbers, or trays which are commonly used in a kitchen, are put on the working coil, namely, a cooking area above the working coil of the induction range, they are recognized as the heating container and a heating operation is started.

For instance, when objects other than the heating container are put on the working coil of the induction range, this is preferably recognized as an abnormal condition and the heating operation should be stopped. However, even if an abnormal container, such as bowls, chopsticks, tongs, scrubbers, or trays, is placed, it may be recognized as the normal heating container and the heating operation may be started. As time passes, the object is heated to a high temperature, and the action of touching or picking up the object may cause burns. Thus, there is a need for an induction range apparatus which is configured such that, when the induction range is used, the heating of the working coil is limited to the use of a normal heating container, thus preventing accidents and fires from occurring due to the heating of similar objects, and the working coil is restrictively heated by determining only a normal heating container as a normal state.

Documents of Related Art (Patent Document 0001) KR 10-2045993

SUMMARY OF THE DISCLOSURE

The present disclosure provides an induction range apparatus capable of sensing a container, which can sense a container by applying a sensing signal that is a low-voltage and high-frequency signal to a working coil.

The present disclosure also provides an induction range apparatus capable of sensing a container, which can prevent induction power from being input into a first detector by detecting a change in electrical characteristics of a working coil while induction power is input into the working coil.

The objectives of the present disclosure are not limited to the above-mentioned objectives, and other objectives and advantages of the present disclosure which are not mentioned will be understood by the following description, and will be more clearly understood by the embodiment of the present disclosure. Furthermore, it will be easily appreciated that objectives and advantages of the present disclosure can be realized by means described in the appended claims and combinations thereof.

In an aspect, an induction range apparatus capable of sensing a container is provided. The induction range apparatus includes a first detector configured to receive and output a sensing signal, and to detect a change in electrical characteristics of a working coil that receives the sensing signal, thus outputting a detection signal; a controller configured to generate the sensing signal and output the signal to the first detector, output an unblock signal so that the sensing signal output to the first detector is finally input into the working coil, and determine whether the container is disposed on the working coil and the container disposed on the working coil may be heated through induction heating, in response to the detection signal, in a container sensing mode, and configured to output a block signal so that induction power outputted from an inverter driver is prevented from being input into the first detector, in an induction heating mode; and a blocking part connected between the inverter driver and the working coil, connected to the first detector, and outputting the induction power input from the inverter driver to the working coil or preventing the induction power input from the inverter driver from being input into the first detector or outputting the sensing signal to the working coil, on the basis of any two or less of the input of the induction power from the inverter driver, the input of the unblock signal from the controller, and the input of the block signal from the controller.

When any one of the induction power and the block signal is input, the blocking part may output the induction power which is input from the inverter driver to the working coil, or may prevent the induction power, which is input from the inverter driver, from being input into the first detector.

When any one of the induction power and the block signal is input, the blocking part may bypass the induction power which is input from the inverter driver to the ground, thus preventing the induction power from being input into the first detector.

When the unblock signal is input, the blocking part may output the sensing signal input from the first detector to the working coil.

When the block signal is input, the blocking part may output the induction power input from the inverter driver to the working coil.

When the block signal is input, the blocking part may connect an output terminal connected to the working coil to an input terminal connected to the inverter driver, and may disconnect the output terminal connected to the working coil from an input terminal connected to the first detector.

When the unblock signal is input, the blocking part may block the induction power which is input from the inverter driver, and may output the sensing signal which is input from the first detector to the working coil.

When the unblock signal is input, the blocking part may disconnect the output terminal connected to the working coil from the input terminal connected to the inverter driver, and may connect the output terminal connected to the working coil to the input terminal connected to the first detector.

DESCRIPTION OF EXEMPLARY EMBODIMENTS

As used herein, expression "configured to" may be replaced with the expression "suitable for", "having the capacity to", "designed to", "adapted to", "made to", or "capable of", for example. The term "configured to" may not necessarily mean "specifically designed to" in hardware. Rather, in some situations, the expression "apparatus configured to" may mean that the apparatus is "capable of" along with other apparatuses or components. For instance, the phrase "controller configured to perform A, B, and C" refers to a dedicated processor (e.g. embedded processor) for performing a corresponding operation, or a generic-purpose processor (e.g. CPU or application processor) that may perform corresponding operations by executing one or more software programs stored in a memory. Here, the processor may mean a controller.

Figure 1:
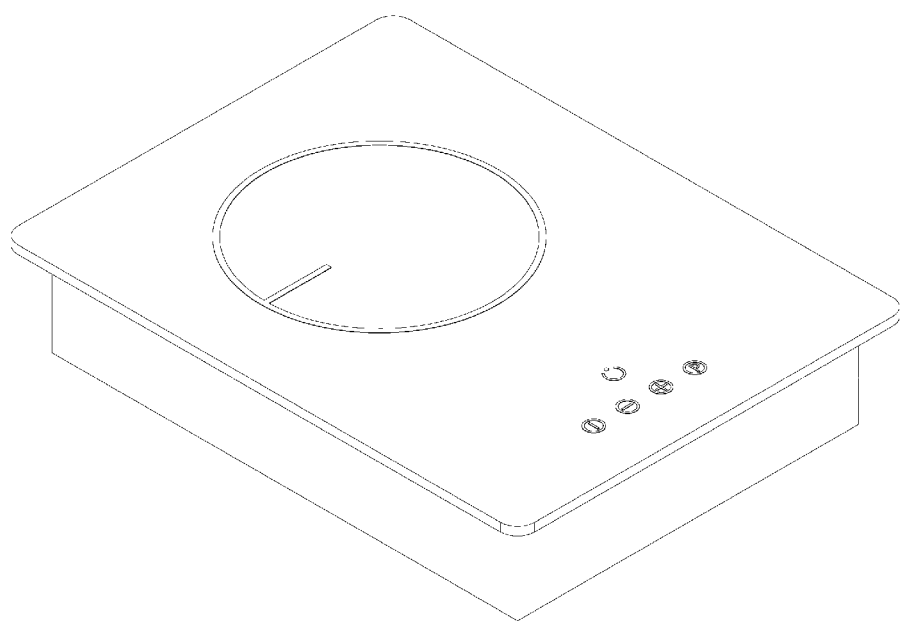
FIG. 1 is a perspective view of an induction range apparatus capable of sensing a container in accordance with an embodiment of the present disclosure.
Figure 2:
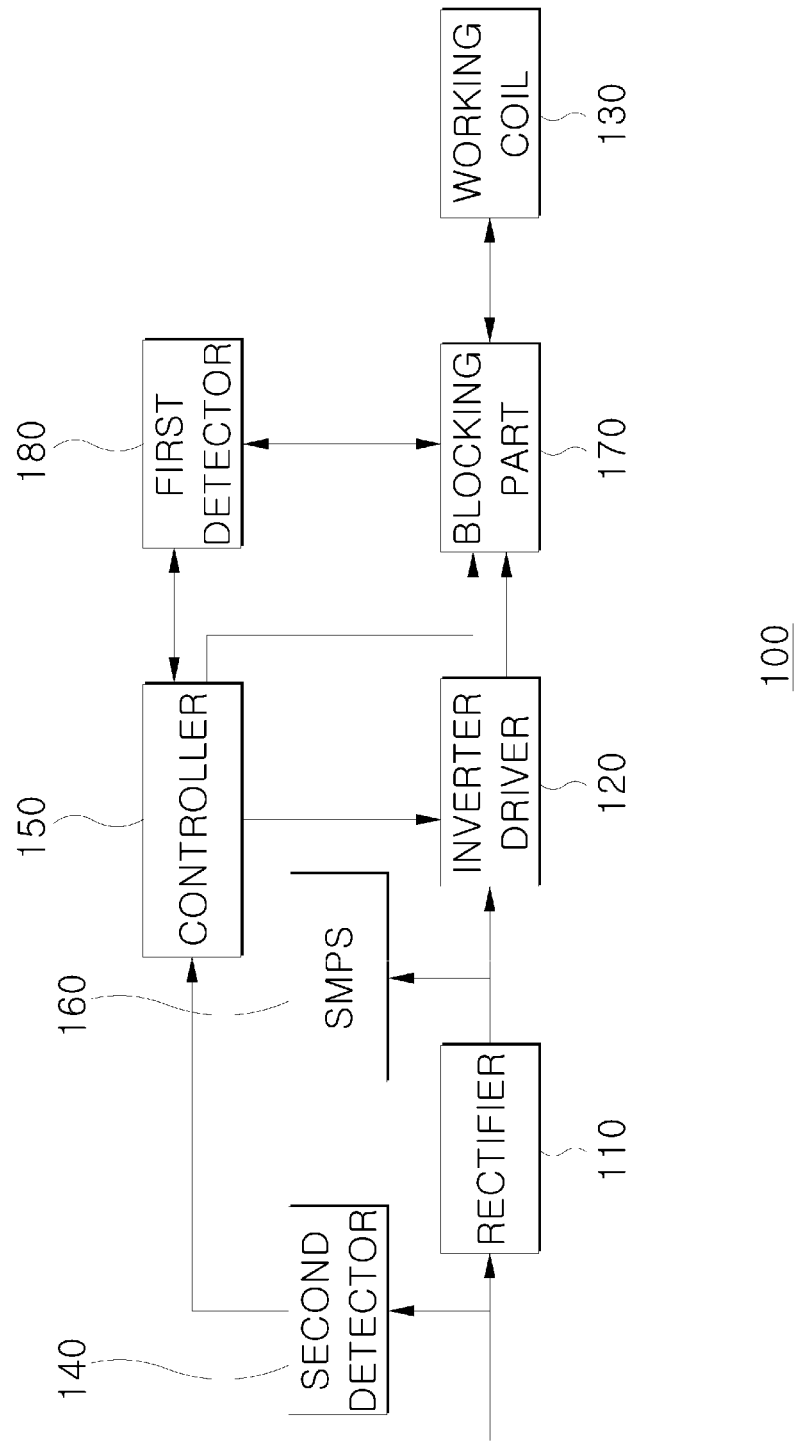
FIG. 2 is a diagram illustrating a connection relationship between components included in an induction range apparatus capable of sensing a container in accordance with an embodiment of the present disclosure.

FIG. 1 is a perspective view of an induction range apparatus 10 capable of sensing a container in accordance with an embodiment of the present disclosure, and FIG. 2 is a diagram illustrating a connection relationship between components included in an induction range apparatus 100 capable of sensing a container in accordance with an embodiment of the present disclosure.

Referring to FIGS. 1 and 2, the induction range apparatus 100 capable of sensing the container in accordance with an embodiment of the present disclosure may sense whether the container is disposed on a working coil, and sense whether the disposed container may be heated through induction heating, when the container is disposed on the working coil.

The induction range apparatus 100 capable of sensing the container in accordance with an embodiment of the present disclosure may include a rectifier 110, an inverter driver 120, a working coil 130, a second detector 140, a controller 150, an SMPS 160, a blocking part 170, and a first detector 180.

Hereinafter, in the specification, a low voltage may mean a voltage ranging from 3.3V to 48V, a high voltage may mean a voltage ranging from 120V to 405V (voltage obtained by rectifying commercial AC 110V to 240V into DC voltage), and a high frequency may mean a frequency ranging from 20 KHz to 1000 KHz.

The rectifier 110 may rectify commercial input AC power into high voltage DC power, and output the rectified high voltage DC power to the inverter driver 120 and the SMPS 160.

The inverter driver 120 may convert high voltage AC power which is input from the rectifier 110 into induction power required to perform induction heating in an induction heating mode, and output the power to the blocking part 170.

Here, the induction power may be high voltage and high frequency AC power.

Meanwhile, the blocking part 170 may output the input induction power to the working coil 130 or prevent the induction power from being input into the first detector 180.

This will be described below in detail.

The inverter driver 120 may not output induction power in response to an output limit signal which is input from the controller 150, and may change power output of the induction power in response to an output control signal which is input from the controller 150.

Figure 3:
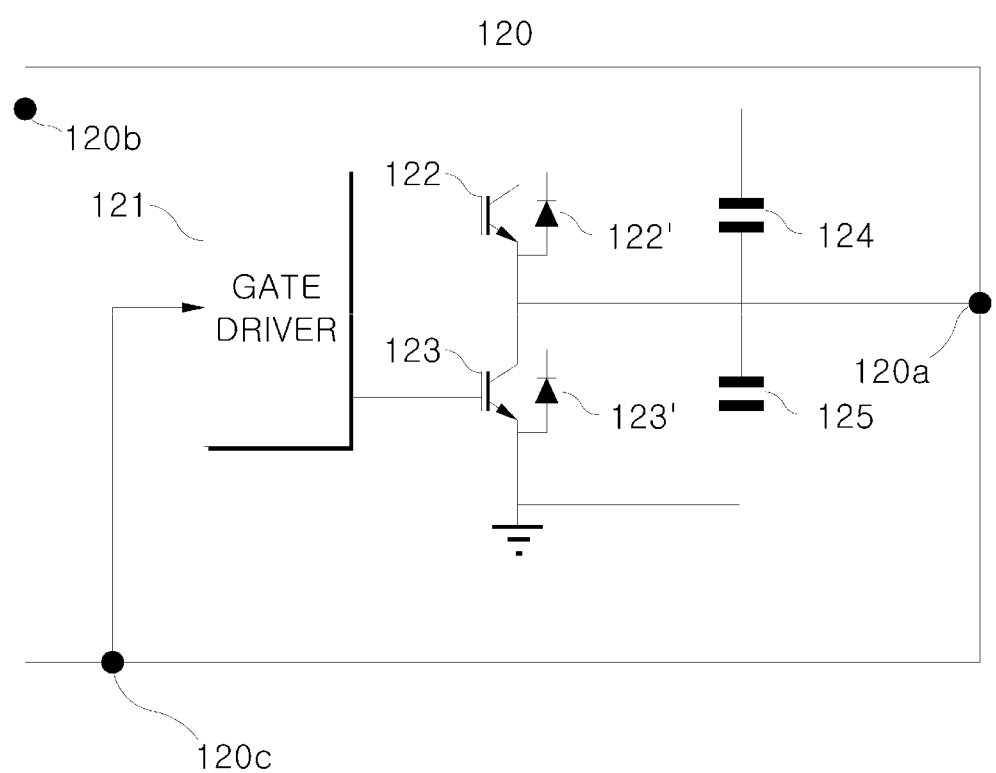
FIG. 3 is a circuit diagram of an inverter driver of an induction range apparatus capable of sensing a container in accordance with an embodiment of the present disclosure.

FIG. 3 is a circuit diagram of an inverter driver 120 of an induction range apparatus 100 capable of sensing a container in accordance with an embodiment of the present disclosure.

Referring to FIG. 3, the inverter driver 120 may include a gate driver 121, a top IGBT 122, a bottom IGBT 123, a first capacitor 124, and a second capacitor 125.

The top IGBT 122 and the bottom IGBT 123 may have a top diode 122' and a bottom diode 123', respectively.

In the circuit structure of the inverter driver 120, an output terminal of the gate driver 121 and a gate terminal of each of the top IGBT 122 and the bottom IGBT 123 may be electrically connected.

Furthermore, an emitter terminal of the top IGBT 122, a collector terminal of the bottom IGBT 123, a second end of the first capacitor 124, a first end of the second capacitor 125, and an output terminal 120a of the inverter driver 120 may be electrically connected to each other.

The output terminal 120a of the inverter driver 120 and the blocking part 170 may be electrically connected to each other.

Thus, the converted induction power may be output from the output terminal 120a of the inverter driver 120 to the blocking part 170.

Furthermore, a collector terminal of the top IGBT 122, a first end of the first capacitor 124, and a first input terminal 120b of the inverter driver 120 may be electrically connected to each other.

The first input terminal 120b of the inverter driver 120 and the rectifier 110 may be electrically connected to each other.

Furthermore, an emitter terminal of the bottom IGBT 123, a second end of the second capacitor 125, and a ground may be electrically connected to each other.

Furthermore, an input terminal of the gate driver 121 and a second input terminal 120c of the inverter driver 120 may be electrically connected to each other.

The second input terminal 120c of the inverter driver 120 and the controller 150 may be electrically connected to each other.

An output block signal may be input into the second input terminal 120c of the inverter driver 120 from the controller 150 in a container sensing mode, and the input terminal of the gate driver 121 may receive the output block signal which is input into the second input terminal 120c of the inverter driver 120, thus outputting a turn-off signal (e.g. 0V voltage signal) to the output terminal.

Each of the top IGBT 122 and the bottom IGBT 123 may be controlled in an OFF state when the turn-off signal is input into the gate terminal.

Thus, the high voltage DC power which is input into the first input terminal 120b of the inverter driver 120 may not be converted into induction power, and may not be output to the output terminal 120a of the inverter driver 120.

Furthermore, in the container sensing mode, a sensing signal may be input into the output terminal 120a of the inverter driver 120, so that each of the first capacitor 124 and the second capacitor 125 may serve as a resonance circuit.

An output control signal may be input into the second input terminal 120c of the inverter driver 120 from the controller 150 in an induction heating mode, and the input terminal of the gate driver 121 may receive the output control signal which is input into the second input terminal 120c of the inverter driver 120, thus outputting a turn-on signal to the output terminal.

Each of the top IGBT 122 and the bottom IGBT 123 may be controlled in an ON state when the turn-on signal is input into the gate terminal.

Thus, the high voltage DC power which is input into the first input terminal 120b of the inverter driver 120 may be converted into induction power, and then be output to the output terminal 120a of the inverter driver 120.

The working coil 130 may receive the induction power of a high voltage and a high frequency to generate an eddy current induced in the container.

Furthermore, the working coil 130 may receive the sensing signal of a low voltage and a high frequency, and voltages and phases on both ends thereof may be changed depending on whether the container may be heated through induction heating.

The second detector 140 may output a current detection signal, corresponding to the current of commercial power during induction heating, to the controller 150.

Such a current detection signal may be a voltage signal having a voltage which is proportional to the current intensity of the commercial power.

The controller 150 may output an output limit signal to the inverter driver 120 so as not to output induction power in the container sensing mode, and may output an output control signal to the inverter driver 120 to change the power output of the induction power in the induction heating mode.

Figure 4:
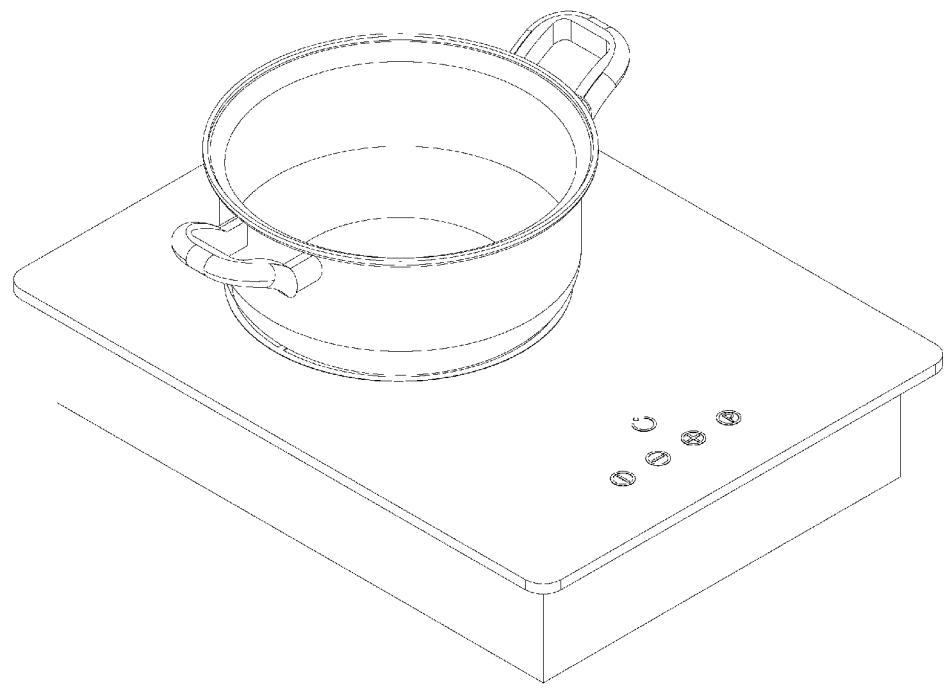
FIG. 4 is a diagram illustrating a state in which a container is disposed on an induction range apparatus capable of sensing a container in accordance with an embodiment of the present disclosure.

As shown in FIG. 4, in the container sensing mode, the controller 150 may generate a sensing signal to output the signal to the first detector 180, and output an unblock signal to the blocking part 170 so that the sensing signal output to the first detector 180 is finally input into the working coil 130, and determine whether the container is disposed on the working coil 130 and the container disposed on the working coil 130 may be heated through induction heating, in response to the detection signal which is output from the first detector 180.

Furthermore, in the induction heating mode, the controller 150 may output a block signal to prevent the induction power, which is output from the inverter driver 120, from being input into the first detector 180.

Such a controller 150 may be an application specific integrated circuit (ASIC).

The SMPS 160 may convert high voltage DC power, which is converted from the rectifier 110, into low voltage DC power, and then supply driving power required to drive each of the rectifier 110, the inverter driver 120, the second detector 140, the controller 150, the blocking part 170, and the first detector 180.

Figure 5:
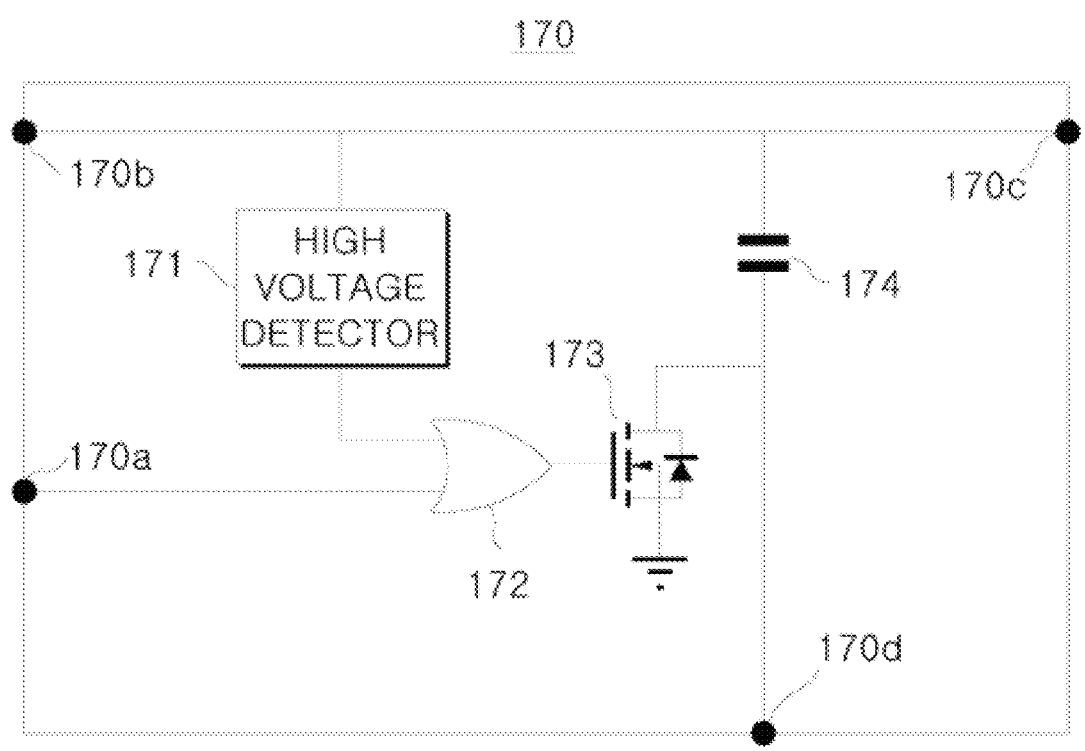
FIG. 5 is a circuit diagram of a blocking part of an induction range apparatus capable of sensing a container in accordance with an embodiment of the present disclosure.

FIG. 5 is a circuit diagram of a blocking part 170 of an induction range apparatus 10 capable of sensing a container in accordance with an embodiment of the present disclosure.

Referring to FIG. 5, the blocking part 170 according to an embodiment may include a high voltage detector 171, an OR logic operator 172, a MOSFET 173, and a coupling capacitor 174.

In the circuit structure of the blocking part 170 according to an embodiment, a first input terminal 170a of the blocking part 170 and an input terminal of the OR logic operator 172 may be electrically connected to each other.

The first input terminal 170a of the blocking part 170 may be electrically connected to the controller 150 to input the unblock signal in the container sensing mode and to input the block signal in the induction heating mode. In this case, the unblock signal may be a low signal, while the block signal may be a high signal.

A second input terminal 170b of the blocking part 170, an input terminal of the high voltage detector 171, a first end of the coupling capacitor 174, and an input/output terminal 170c of the blocking part 170 may be electrically connected to each other.

The second input terminal 170b of the blocking part 170 may be electrically connected to the inverter driver 120 to receive induction power. The induction power which is input into the second input terminal 170b of the blocking part 170 may be input into an input terminal of the high voltage detector 171.

Here, an output terminal of the high voltage detector 171 and an input terminal of the OR logic operator 172 may be electrically connected to each other. When the induction power is input into the input terminal of the high voltage detector 171, a high signal may be output to the output terminal.

In contrast, unless the induction power is input into the input terminal of the high voltage detector 171, a low signal may be output to the output terminal.

Thus, in any one of a case where the block signal is input into the first input terminal 170a of the blocking part 170, a case where the induction power is input into the second input terminal 170b of the blocking part 170, and a case where the block signal is input into the first input terminal 170a of the blocking part 170 and the induction power is input into the second input terminal 170b of the blocking part 170, the OR logic operator 172 may output the high signal to the output terminal which is electrically connected to a gate terminal of the MOSFET 173. In this case, the MOSFET 173 may be changed to a turn-on state.

In contrast, when the unblock signal is input into the first input terminal 170a of the blocking part 170 and the induction power is not input into the second input terminal 170b of the blocking part 170, the OR logic operator 172 may output the low signal to the output terminal which is electrically connected to the gate terminal of the MOSFET 173. In this case, the MOSFET 173 may be changed to a turn-off state.

Meanwhile, the induction power which is input into the second input terminal 170b of the blocking part 170 may be output to the input/output terminal 170c of the blocking part 170, and be input into the working coil 130 which is electrically connected to the input/output terminal 170c of the blocking part 170.

Furthermore, the induction power which is input into the second input terminal 170b of the blocking part 170 may pass through the coupling capacitor 174, and then be input into either of an I/O output terminal 170d of the blocking part 170 which is electrically connected to the second end of the capacitor 174 or a drain terminal of the MOSFET 173 which is electrically connected to the second end of the capacitor 174, depending on the state of the MOSFET 173.

To be more specific, when the MOSFET 173 is in the turn-on state due to the input of the block signal and the input of the induction power in the induction heating mode, the induction power may not be input into the I/O output terminal 170*d* of the blocking part 170 which is electrically connected to the first detector 180, but may be input into the drain terminal of the MOSFET 173 to be bypassed to the ground which is electrically connected to a source terminal of the MOSFET 173.

In contrast, when the MOSFET 173 is in the turn-off state because the unblock signal is input and the induction power is not input in the container sensing mode, the sensing signal, which is output from the controller 150, passes through the first detector 180, and then is input into the I/O output terminal 170*d* of the blocking part 170, may be output from the third output terminal 170*c* of the blocking part 170 and then be input into the working coil 130.

Meanwhile, only the sensing signal may be transmitted in the container sensing mode, so that the coupling capacitor 174 may serve as a resonance circuit.

Such a blocking part 170 may be configured such that, when it receives the block signal from the controller 150 in the induction heating mode, the induction power output from the inverter driver 120 is not input through the blocking part 170 into the first detector 180 which is a low-voltage driving circuit. Meanwhile, the blocking part 170 may be configured such that, when it receives the unblock signal from the controller 150 in the container sensing mode, the blocking part may provide a detection signal path so that the sensing signal output from the controller 150 is input through the blocking part 170 into the working coil 30.

To be more specific, the blocking part 170 may be connected between the inverter driver 120 and the working coil 130, be connected to the first detector 180, and output the induction power input from the inverter driver 120 to the working coil 130 or prevent the induction power input from the inverter driver 120 from being input into the first detector 180 or output the sensing signal to the working coil 130, on the basis of any two or less of the input of the induction power from the inverter driver 120, the input of the unblock signal from the controller 150, and the input of the block signal from the controller 150.

In detail, when any one of the induction power and the block signal is input, the blocking part 170 may output the induction power which is input from the inverter driver 120 to the working coil 130 or prevent the induction power which is input from the inverter driver 120 from being input into the first detector 180.

Here, the case where the block signal is input into the blocking part 170 may correspond to the induction heating mode.

When any one of the induction power and the block signal is input, the blocking part 170 may bypass the induction power which is input from the inverter driver 120 to the ground, thus preventing the induction power from being input into the first detector 180.

Furthermore, when the unblock signal is input, the blocking part 170 may output the sensing signal which is input from the first detector 180 to the working coil 130.

Here, the case where the unblock signal is input into the blocking part 170 may correspond to the container sensing mode.

When the block signal is input, the blocking part 170 may output the induction power which is input from the inverter driver 120 to the working coil 130.

Meanwhile, only the sensing signal may be transmitted in the container sensing mode, so that the coupling capacitor 174 may serve as a resonance circuit.

Figure 6:
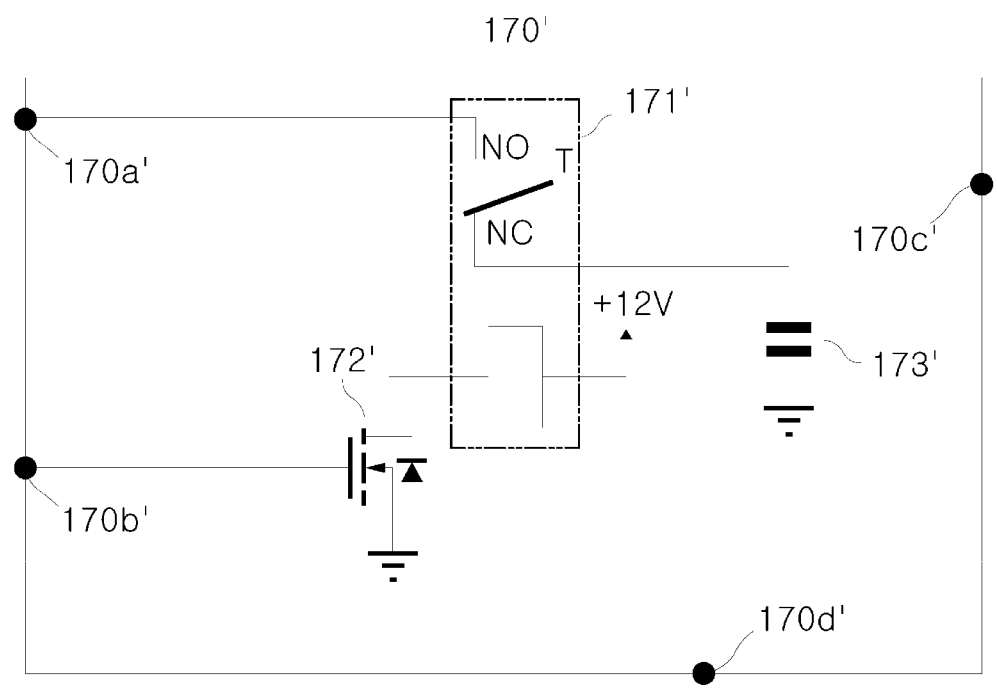
FIG. 6 is a circuit diagram of a blocking part of an induction range apparatus capable of sensing a container in accordance with another embodiment of the present disclosure.

FIG. 6 is a circuit diagram of a blocking 170' of an induction range apparatus 100 capable of sensing a container in accordance with another embodiment of the present disclosure.

Referring to FIG. 6, the blocking part 170' according to another embodiment may include a relay 171', a driving device 172', and a capacitor 173'.

In the circuit structure of the blocking part 170' according to another embodiment, when a first input terminal 170*a*' of the blocking part 170' and the driving device 172' are electrically connected to each other, so that the block signal is input into the first input terminal 170*a*' of the blocking part 170' which is electrically connected to the controller 150, the driving device 172' may output a turn-close signal to the relay 171'.

In contrast, when the unblock signal is input into the first input terminal 170*a*' of the blocking part 170', the driving device 172' may output a turn-open signal to the relay 171'.

Thus, when the turn-close signal is input, the relay 171' may electrically connect a normal close terminal NC of the relay 171' and a common terminal T. When the turn-open signal is input, the relay may electrically connect a normal open terminal NO and the common terminal T.

The common terminal T of the relay 171' may be electrically connected to an output terminal 170*c*' of the blocking part 170' which is electrically connected to the working coil 130.

The normal open terminal NO of the relay 171' may be electrically connected to the first input terminal 170*a*' of the blocking part 170' which is electrically connected to the inverter driver 120.

The normal close terminal NC of the relay 171' may be electrically connected to a second input terminal 170*b*' of the blocking part 170' which is electrically connected to the inverter driver 120.

Meanwhile, the normal close terminal NC of the relay 171', the first end of the capacitor 173', and an input/output terminal 170*d*' of the blocking part 170' may be electrically connected to each other, and the input/output terminal 170*d*' of the blocking part 170' may be electrically connected to the first detector 180.

Thus, when the normal close terminal NC and the common terminal T of the relay 171' are electrically connected to each other due to the input of the block signal in the container sensing mode, the sensing signal, which is output from the controller 150, passes through the first detector 180, and is input into the input/output terminal 170*d* of the blocking part 170', may be output from the third output terminal 170*c* of the blocking part 170 and then be input into the working coil 130.

In contrast, when the normal open terminal NO and the common terminal T of the relay 171' are electrically connected to each other due to the input of the unblock signal in the induction heating mode, the induction power input into the first input terminal 170*a*' of the blocking part 170' may be output to the output terminal 170*c*' of the blocking part 170'.

Meanwhile, only the sensing signal may be transmitted in the container sensing mode, so that the capacitor 173' may serve as a resonance circuit.

When the block signal is input, the blocking part 170 may connect an output terminal connected to the working coil 130 and an input terminal connected to the inverter driver 120, and may disconnect the output terminal connected to the working coil 130 and the input terminal connected to the first detector 180 from each other.

When the unblock signal is input, the blocking part 170 may block the induction power which is input from the inverter driver 120, and output the sensing signal which is input from the first detector 180 to the working coil 130.

When the unblock signal is input, the blocking part 170 may disconnect the output terminal connected to the working coil 130 and the input terminal connected to the inverter driver 120 from each other, and may connect the output terminal connected to the working coil 130 and the input terminal connected to the first detector 180.

The first detector 180 may receive and output the sensing signal, and detect a change in electrical characteristics of the working coil 130 which receives the sensing signal, thus outputting the detection signal to the controller.

Here, the change in electrical characteristics may be changed in voltage and phase on both ends of the working coil 130.

To be more specific, when the sensing signal input from the controller 150 is input into the working coil 130 through a certain load resistor, so that impedance of the resonance circuit composed of the working coil 130 and peripheral capacitors 122', 123', 174 and 173' is changed depending on the presence and type of the container placed on the working coil 130, the first detector 180 may detect changes in voltage and phase on both ends of the working coil 130, thus outputting the detection signal to the controller 150.

While a preferred embodiment has been described, it is to be understood by those skilled in the art that modifications and variations are possible without departing from the essential characteristics of the present disclosure. Therefore, the present embodiments are illustrative and not restrictive. It should also be understood that the scope of the present disclosure is defined by the appended claims rather than by the description preceding them, and all changes that fall within the claims or equivalence thereof are construed as being embraced in the present disclosure.

Although the present disclosure has been described by specific exemplary embodiments and drawings, it is apparent to those skilled in the art that the present disclosure is not limited thereto and various modifications and changes may be made without departing from the spirit or scope of the following claims.

According to the present disclosure, by applying a sensing signal that is a low-voltage and high-frequency signal to a working coil to sense a container, it is possible to reduce noise and power consumption and to improve sensing performance.

Furthermore, according to the present disclosure, by preventing induction power from being input into a first detector detecting a change in electrical characteristics of a working coil while the induction power is input into the working coil, it is possible to prevent the induction power which is a high voltage from being input into the detector and thereby causing damage.

What is claimed is:

1. An induction range apparatus capable of sensing a container, comprising:
a first detector configured to receive and output a sensing signal, and to detect a change in electrical characteristics of a working coil that receives the sensing signal, thus outputting a detection signal;
a controller configured to generate the sensing signal and output the signal to the first detector, output an unblock signal so that the sensing signal output to the first detector is finally input into the working coil, and determine whether the container is disposed on the working coil, and the container disposed on the working coil is heated through induction heating, in response to the detection signal, in a container sensing mode, and configured to output a block signal so that induction power outputted from an inverter driver is prevented from being input into the first detector, in an induction heating mode; and
a blocking part connected between the inverter driver and the working coil, connected to the first detector,
wherein the first detector is electrically connected to the controller and the blocking part,
wherein when any one of the induction power and the block signal is input, the blocking part outputs the induction power which is input from the inverter driver to the working coil,
wherein when any one of the induction power and the block signal is input, the blocking part bypasses the induction power which is input from the inverter driver to the ground, thus preventing the induction power from being input into the first detector,
wherein the blocking part include a high voltage detector, an OR logic operator a MOSFET, and a coupling capacitor,
wherein a first input terminal of the blocking part is electrically connected to an input terminal of the OR logic operator,
wherein a first input terminal of the blocking part is electrically connected to the controller to input the unblock signal in the container sensing mode and to input the block signal in the induction heating mode,
wherein the unblock signal is a low signal,
wherein the block signal is a high signal,
wherein a second input terminal of the blocking part is electrically connected to an input terminal of the high voltage detector, a first end of the coupling capacitor, and an input/output terminal of the blocking part,
wherein the second input terminal of the blocking part is electrically connected to the inverter driver to receive induction power,
wherein the induction power which is input into the second input terminal of the blocking part is input into an input terminal of the high voltage detector,
wherein an output terminal of the high voltage detector is electrically connected to the input terminal of the OR logic operator,
wherein when the induction power is input into the input terminal of the high voltage detector, a high signal is output to the output terminal of the high voltage detector,
wherein when any one of a case where the block signal is input into the first input termina of the blocking part and a case where the induction power is input into the second input terminal of the blocking part, the OR logic operator output the high signal to the output terminal which is electrically connected to a gate terminal of the MOSFET,
wherein the MOSFET is changed to a turn-on state,
wherein the induction power which is input into the second input terminal of the blocking part output to the input/output terminal of the blocking part, and be input into the working coil, which is electrically connect ed to the input/output terminal of the blocking part.

2. The induction range apparatus of claim 1, wherein, when the unblock signal is input, the blocking part outputs the sensing signal input from the first detector to the working coil.

* * * * *